United States Patent

[11] 3,609,047

| | | |
|---|---|---|
| [72] | Inventor | Douglas G. Marlow<br>Arcadia, Calif. |
| [21] | Appl. No. | 15,536 |
| [22] | Filed | Mar. 2, 1970 |
| [45] | Patented | Sept. 28, 1971 |
| [73] | Assignee | Xerox Corporation<br>Rochester, N.Y. |

[54] SINGLE BEAM PHOTOMETER SYSTEM WHEREIN THE ABSORBANCE OF A SAMPLE IS DETERMINED RELATIVE TO A REFERENCE
8 Claims, 2 Drawing Figs.

| | | |
|---|---|---|
| [52] | U.S. Cl. | 356/205,<br>250/218 |
| [51] | Int. Cl. | G01n 21/24 |
| [50] | Field of Search | 356/184,<br>186, 205, 96, 99, 179; 250/218 |

[56] References Cited
UNITED STATES PATENTS

| | | | |
|---|---|---|---|
| 3,551,062 | 12/1970 | Brown | 356/244 X |

*Primary Examiner*—Ronald L. Wibert
*Assistant Examiner*—Orville B. Chew, II
*Attorneys*—James J. Ralabate, John E. Beck, Franklyn C. Weiss and Irwing C. Weiss ABSTRACT: A single beam photometer system for measuring the differential optical absorbance of a sample with respect to a reference. The sample and the reference are held in a two compartment container. A rotating transport wheel driven by a stepping motor is utilized to move the container so as to pass the sample and the reference through a light beam in succession. The intensity of the light transmitted through the sample and the reference is measured by a photocell. The output from the photocell is fed into an electronic system which produces an output signal corresponding to the differential optical absorbance of the sample with respect to the reference.

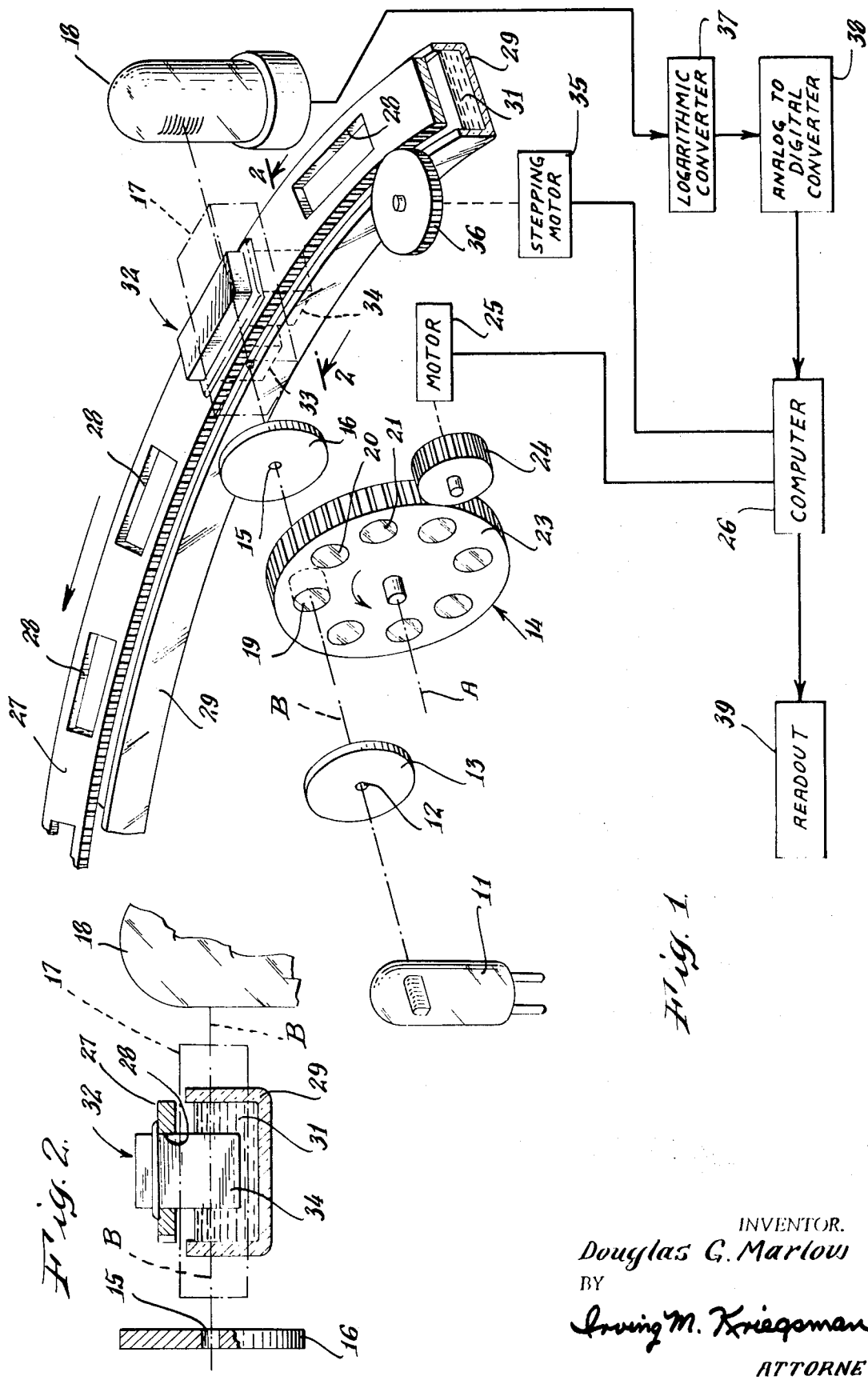

SINGLE BEAM PHOTOMETER SYSTEM WHEREIN THE ABSORBANCE OF A SAMPLE IS DETERMINED RELATIVE TO A REFERENCE

This invention relates to photometer systems. More particularly, this invention relates to a single beam photometer system for measuring the differential optical absorbance of a sample with respect to a reference.

Photometer systems for measuring a differential optical characteristic, such as absorbance, of a sample relative to a reference generally fall into two classes, the single beam type system and the double beam type system. In the conventional double beam type system two separate beams of light are alternately passed respectively through the sample and the reference and impinge on a photodetector. One of the principal disadvantages of double beam systems is the practical impossibility of providing two beams having identical optical efficiencies over a range of wavelengths. In the conventional single beam type system, a single beam of light is passed alternately through the sample and the reference (or vice versa) and impinges on a photodetector. One of the principal advantages of single beam systems is the electrical instability (drift rate) of the systems during the time interval in which the light beam is passed in succession through the sample and the reference. In order to correct for or at least minimize the electrical instability in single beam systems, several modified single beam systems have been proposed and/or actually constructed. In U.S. Pat. No. 3,441,349 there is disclosed a single beam type system in which the light source and detector are stationary, the sample and the reference are alternately moved into the light beam by operating a control and a second beam of light of constant intensity is utilized to minimize electrical instability. In U.S. Pat. No. 2,868,060 there is disclosed a single beam type system in which the light source, the detector, the sample and the reference are all fixed relative to each other and in which a portion of the light beam emitted by the light source is laterally shifted, by using mirrors mounted on an oscillating support member, so as to pass alternately through the sample and the reference.

It is an object of this invention to provide a new and improved single beam type photometer system.

It is another object of this invention to provide a single beam photometer system for measuring the differential optical absorbance of one or more samples at one or more wavelengths.

It is still another object of this invention to provide a single beam photometer system that is relatively simple in construction, does not require any mirror or lenses and in which the error due to electrical instability is negligible.

It is yet still another object of this invention to provide a technique for rapidly interposing a sample and a reference in a light beam in succession.

According to this invention, the above and other objects are achieved by providing a single beam photometer system in which the light source, the light beam and the light detector are fixed relative to each other and in which the sample and reference are indexed through the light beam in very rapid succession. In the embodiment of the invention described below, the rapid successive movement of the sample and the reference through the light beam is achieved by holding the sample and reference in a single two-compartment container and mounting the container on a transport wheel which is turned in an indexing movement by a stepping motor coupled to a computer.

Many advantages and features of the invention will become apparent on reading the following detailed description and when taken in connection with the accompanying drawings in which like reference numerals represent like parts and wherein:

FIG. 1 is a view partly in perspective and partly in schematic of an embodiment of the invention; and FIG. 2 is a section view taken along lines 2—2 in FIG. 1.

Referring to the drawings there is shown a light source 11. Light produced by the light source 11 emerging through a beam-defining aperture 12 in a plate 13 passed through a wavelength selector 14. Light passed by the wavelength selector 14 emerging through a beam-defining aperture 15 in a plate 16 passes through a test zone 17 and impinges on a light detector 18.

The source 11 is preferably a quartz-halogen lamp having a highly concentrated filament but may be any other similar source of white light.

The wavelength selector 14 is made up of a plurality of narrow band filters 19, 21, 22, etc., mounted on a rotatable wheel 23. Each filter is designed to pass light over a different spectral region. The wheel 23 is coupled through a gear 24 to a motor 25 which is connected to a computer 26. On command from the computer 26 to the wheel 23 is turned about its central axis A so as to selectively position one of the filters along the light beam axis B. The light detector 18 is a photocell or other similar device which produces an electrical signal corresponding to the intensity of light impinging thereon.

Located above the test zone 17 is a transport wheel 27 having a plurality of slots 28. Located underneath the transport wheel 27 is a transparent annular shaped trough 29 filled with a fluid 31. The index of refraction of the fluid 31 is as closely matched as possible to the index of refraction of the sample and reference. Seated in each one of the slots 28 and extending downward into the fluid 31 is a removable transparent container. For simplicity, only one container 32 is shown in the drawing. The container 32 is provided with two compartments 33 and 34, one of the compartments being for holding the sample and the other compartment being for holding the reference. The transport wheel 27 is turned in an indexing movement by stepping motor 35 which is mechanically coupled to the transport wheel 27 through a gear 36 which is electrically coupled to the computer 26. As the transport wheel 27 is turned each compartment of each container is passed through the light beam in succession. Since the compartments are immersed in the fluid 31 whose index of refraction is matched to the index of refraction of the sample and reference the light beam always emerges from the test zone 17 along the same path and is not laterally shifted due to the particular angle at which the light beam strikes the sample or the reference. Thus, the light beam always impinges on the same portion of the light detector 18, even through the container 32 is presented at the test zone 17 in such a position that the light beam passes through the two compartments 33 and 34 at different angles.

The indexing movement of the transport wheel 27 is such that there is a dwell period when the centers of the compartments are at the test zone 17 in the path of the light beam and the two compartments of a container are in the path of the light beam during successive dwell periods.

This may be achieved, for example, by sizing the slots and containers so that the arcuate distance from the center of the first compartment of one container to the center of the second compartment of the same container is one half of the arcuate distance from the center of the second compartment of a container to the center of the first compartment of the next following container, by locating the slots on the transport wheel so that the stepping motor dwells when the center of a compartment is aligned at the light beam axis and by providing a gear ratio so that transport wheel turns during a moving period of the stepping motor an arcuate distance corresponding to the arcuate distance between the centers of the two compartments of a container.

The dwell period of the stepping motor 35 is very short, such as, for example, 0.5 seconds and the moving period of the stepping motor 35 is also very short, such as, for example, 0.5 second. Thus the total elapsed time from when the first compartment of a container arrives at the test zone 17 to when the second compartment of the same container leaves the test zone 17 is also very short. Because of this very short time interval, the error due to the electrical instability of the system is negligible.

The output signal from the light detector 18 is passed to a logarithmic converter 37 and the output signal from the logarithmic converter 37 is passed to an analog to digital converter 38. The digital signal output from the analog to digital converter 38 is passed to the computer 26. In the computer 26, the digital signal output when the sample is in the light beam is subtracted from the digital signal output when the reference is in the light beam. A signal corresponding to the difference, which represents the differential optical absorbance of the sample relative to the reference, is passed to a readout device 39, such as a meter or a pen recorder.

What is claimed is:

1. A single beam photometer system for measuring the intensity of light passed through a sample and a reference comprising:
   a container having a compartment for holding said sample and a compartment for holding said reference;
   means for projecting a beam of light along a fixed path;
   container transport means, including a transport wheel for holding said container and a stepping motor for driving said transport wheel, for moving said container across said beam path so as to illuminate said sample and said reference in rapid succession; and
   a light detector for measuring the intensity of light transmitted through said sample and said reference.

2. A single beam photometer system for measuring the differential optical absorption of a sample relative to a reference comprising:
   means for projecting a beam of monochromatic light along a fixed path;
   a container having two compartments, one of said compartments for holding said sample and the other said compartment for holding the reference;
   transport means for transporting said container so as to move said sample and said reference in said beam path in rapid succession, said transport means including a rotatable transport wheel for holding said container and a stepping motor operatively connected to said transport wheel for driving said transport wheel;
   a light detector for measuring the intensity of the light transmitted through said sample and said reference and producing a separate electrical signal corresponding to each of said intensities; and
   electronic means for processing said two signals and producing an output signal corresponding to the difference in the logarithm of said signals, said output signal corresponding to the differential optical absorbance of said sample relative to said reference.

3. The system according to claim 2 and wherein said means for projecting a beam of monochromatic light comprises a chromatic light source for projecting a beam of chromatic light along a fixed path and a wavelength selector disposed along said beam path.

4. The system according to claim 2 and wherein the stepping motor is designed to provide a moving period of about 0.5 second and a dwell period of about 0.5 second.

5. The system according to claim 4 and wherein the two compartments of the container are successively interposed in the light beam during successive dwell periods of the stepping motor.

6. The system according to claim 2 and wherein the total time interval during which successive compartments of a container are interposed in the light beam is about 1.5 seconds.

7. The system according to claim 2 and wherein the electronics includes an analog converter coupled to the light detector, an analog to digital converter coupled to the analog converter and a computer coupled to the analog to digital converter.

8. The system according to claim 2 and further including a quantity of fluid having an index of refraction approximately equal to the sample and the reference surrounding the container so as to prevent any relative lateral shifting of the light beam as it passes through the two compartments of the container.